United States Patent Office 3,629,302
Patented Dec. 21, 1971

3,629,302
6-CHLORO-20-SUBSTITUTED-PREGNANES
Andor Fürst, Basel, and Marcel Muller, Frenkendorf, Switzerland, assignors to Hoffmann-La Roche Inc., Nutley, N.J.
No Drawing. Filed May 14, 1969, Ser. No. 824,694
Claims priority, application Switzerland, May 20, 1968, 7,484/68
Int. Cl. C07c *169/30*
U.S. Cl. 260—397.4        14 Claims

ABSTRACT OF THE DISCLOSURE 6-halo compounds of the formula

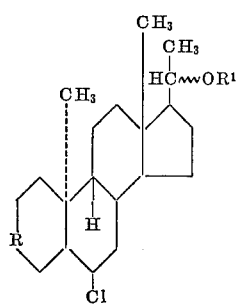

wherein R is a 3-keto-$\Delta^4$-, a 3-keto-$\Delta^{4,6}$-, a 3-keto-$\Delta^{1,4}$-, a 3-keto-$\Delta^{1,4,6}$-, a 3-alkoxy-$\Delta^{3,5}$-, a 3-alkoxy-$\Delta^{4,6}$-, a 3-acyloxy-$\Delta^{3,5}$-, a 3-acyloxy-$\Delta^{4,6}$-, a 3-acyloxy-$\Delta^{2,4,6}$- or a 3-hydroxy-$\Delta^{4,6}$-system; and $R^1$ is hydrogen or acyl. These compounds are useful as progestational agents.

DETAILED DESCRIPTION

This invention relates to novel 9$\beta$,10$\alpha$-steroids. More particularly, it relates to 6-chloro-20-substituted pregnanes and methods for their preparation. The novel steroids of this invention can be represented by the following formula:

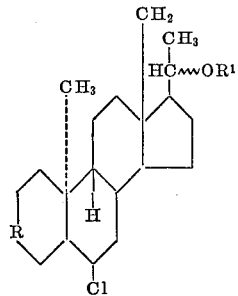

I wherein R is a 3-keto-$\Delta^4$-, a 3-keto-$\Delta^{4,6}$-, a 3-keto-$\Delta^{1,4}$-, a 3-keto-$\Delta^{1,4,6}$-, a 3-alkoxy-$\Delta^{3,5}$-, a 3-alkoxy-$\Delta^{4,6}$-, a 3-acyloxy-$\Delta^{3,5}$-, 3-acyloxy-$\Delta^{4,6}$-, a 3-acyloxy-$\Delta^{2,4,6}$- or a 3-hydroxy-$\Delta^{4,6}$-system; and $R^1$ is hydrogen or acyl.

The compounds represented by Formula I are denoted as 9$\beta$,10$\alpha$-steroids by which is meant that the C–10 methyl group exhibits an $\alpha$-configuration and the C–9 hydrogen atom exhibits a $\beta$-configuration. The difference from the normal steroid series accordingly exists which reference to the configuration of the C–9 hydrogen atom and the C–10 methyl group. Thus, these 9$\beta$,10$\alpha$-steroids have a different planar configuration than the normal steroids, possessing a B/c cis-ring junction in constrast to the B/C-trans-ring junction of the normal steroids.

As used herein the terminology alkoxy denotes aliphatic, cycloaliphatic or araliphatic alkoxy group having up to 10 carbon atoms such as methoxy, ethoxy, propoxy, isopropoxy, butoxy, tertiarybutoxy, cyclopentoxy, cyclohexoxy, phenoxy and benzyloxy. The term acyl denotes a radical derived from a saturated or unsaturated aliphatic, cycloaliphatic, araliphatic or aromatic carboxylic acid of up to 20 carbons formed by removal of the hydroxy moiety from the carboxy group. The acid may be saturated, unsaturated straight or branched chain and includes formic acid, acetic acid, pivalic acid, propionic acid, butyric acid, valeric acid, caproic acid, enanthic acid, oleic acid, palmitic acid, stearic acid, succinic acid, malonic acid, citric acid and benzoic acid.

Examplary compounds of Formula I, obtainable by the process hereinafter described and exemplified are the following:

6-chloro-3$\alpha$,20$\beta$-dihydroxy-9$\beta$,10$\alpha$-pregna-4,6-diene
6-chloro-20$\beta$-hydroxy-9$\beta$,10$\alpha$-pregna-4,6-dien-3-one
6-chloro-20$\alpha$-hydroxy-9$\beta$,10$\alpha$-pregna-4,6-dien-3-one
6-chloro-20$\alpha$-hydroxy-9$\beta$,10$\alpha$-pregna-1,4,6-triene-3-one
6-chloro-20$\beta$-hydroxy-9$\beta$,10$\alpha$-pregna-1,4,6-trien-3-one
6-chloro-20$\beta$-acetoxy-9$\beta$,10$\alpha$-pregna-4,6-dien-3-one
6-chloro-20$\beta$-acetoxy-9$\beta$,10$\alpha$-pregna-1,4,6-trien-3-one
6-chloro-3$\alpha$,20$\beta$-diacetoxy-9$\beta$,10$\alpha$-pregna-4,6-diene
3$\alpha$-ethoxy-6-chloro-20$\beta$-hydroxy-9$\beta$,10$\alpha$-pregna-4,6-diene
20$\beta$-acetoxy-3$\alpha$-ethoxy-6-chloro-9$\beta$,10$\alpha$-pregna-4,6-diene
20$\alpha$-acetoxy-6$\beta$-chloro-9$\beta$,10$\alpha$-pregn-4-en-3-one
20$\alpha$-acetoxy-6-chloro-9$\beta$,10$\alpha$-pregna-1,4,6-trien-3-one
20$\alpha$-acetoxy-6-chloro-9$\beta$,10$\alpha$-pregna 4,6-dien-3-one The 20-functionalized oxygen group can either have an $\alpha$- or $\beta$-configuration. A preferred group of compounds represented by Formula I are those wherein R is a 3-keto-$\Delta^{4,6}$- or a 3-keto-$\Delta^{1,4,6}$-system; $R^1$ is hydrogen or lower alkanoyl, preferably acetyl.

Exemplary methods for the preparation of compounds represented by the genus of Formula I from known starting materials are schematically detailed in the following reaction scheme captioned Reaction Scheme A.

Reaction Scheme A

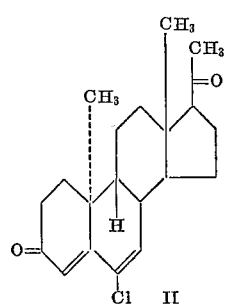
II

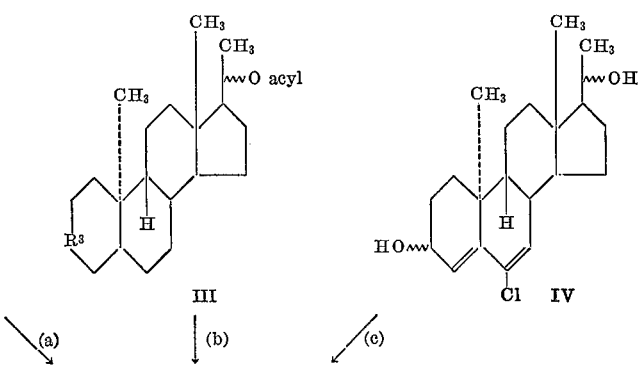
III    IV (a)    (b)    (c)

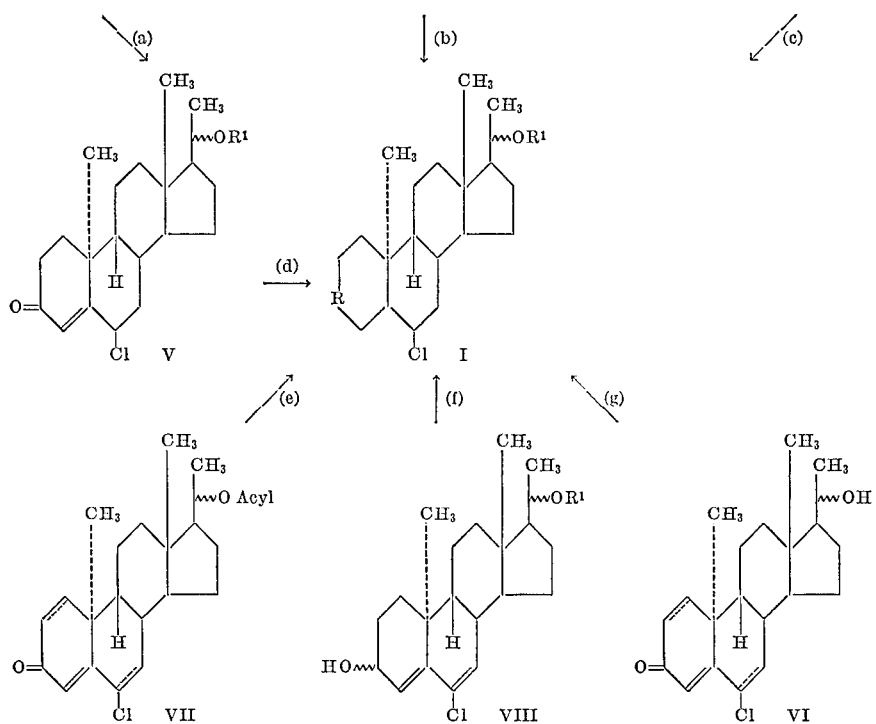

With reference thereto:

(A) When it is desired to prepare the 3,20-dihydroxy derivative of Formula I, a compound of the Formula II can be treated in accordance with process step (a) of Reaction Scheme A, with a reducing agent such as a complex metal hydride, e.g., lithium aluminum hydride, sodium borohydride or diisobutyl aluminum hydride by means known to the art.

(B) A compound of the Formula III wherein $R^3$ is a 3-acyloxy-$\Delta^{3,5}$- or 3-alkoxy-$\Delta^{3,5}$-system is treated with a chlorinating agent in accordance with process step (b) of Reaction Scheme A to yield the corresponding compound of Formula I. Exemplary of the chlorinating agents which may be employed are chlorine, N-chloroimides or N-chloroamides such as N-chlorosuccinimide or N-chloroacetamide. Compounds of the Formula III above wherein $R^3$ represents a 3-keto-$\Delta^{4,6}$-system can be chlorinated by treatment with chromyl chloride, and then this intermediate reaction product can be dehydrated with an acidic reagent such as a hydrogen halide, e.g., hydrogen chloride or hydrogen bromide to yield the desired compound of Formula I. Suitable solvents are inert organic solvents such as ethers, e.g., dioxane or tetrahydrofuran, lower alkanoic acids, e.g., acetic acid or dilower alkyl ketones, e.g., acetone. Further, compounds of the Formula III wherein $R^3$ is a 3-keto-$\Delta^{4,6}$-system can be chlorinated by first converting the starting steroid to the corresponding 6,7-oxide by reaction with a per acid such as perphthalic acid which upon treatment with hydrogen chloride yields the 6-chloro-7-hydroxy derivative which can then be further reacted by dehydration as described hereinabove to yield the 6(7) double bond.

(C) A 3-hydroxy-9β,10α-steroid of the Formula IV can be converted to the corresponding 3-keto derivative of Formula I in accordance with process step (c) of Reaction Scheme A by partially oxidizing the 3-hydroxy moiety. The partial oxidation can be effected by means of manganese dioxide or dichlorodicyanobenzoquinone.

(D) A $\Delta^4$-9β,10α-steroid of the Formula V can be dehydrogenated in accordance with step (d) of Reaction Scheme A to yield the corresponding $\Delta^1$ or $\Delta^6$ derivatives of Formula I. Suitable reagents for effecting the dehydrogenation at the 6(7) position include benzoquinones, preferably, dichlorodicyanobenzoquinone in dioxane which contains in solution about 1% to 10% of mineral acid, e.g., hydrogen chloride. The dehydrogenation can be conveniently carried out in other organic solvents, such as a dilower alkyl ketone, e.g., acetone, or in a lower alcohol, e.g., amyl alcohol or hydrocarbons such as benzene. A preferred method for introducing the 1(2) double bond comprises treatment with dichlorodicyanobenzoquinones in dioxane containing small amounts (about 0.1% to 1.0%) of mineral acid, e.g., hydrogen chloride. Additionally, the 1(2) double bond can be introduced by treatment with selenium dioxide in a lower alkanol solvent such as tertiary butanol or amyl alcohol. Alternatively, the compounds represented by Formula V can be converted to the corresponding 3-enol ethers by means known to the art followed by treatment with manganese dioxide to introduce the 6(7) double bond.

(E) The 20-hydroxy group of a 9β,10α-steroid of the Formula VI or a free hydroxy group of a 9β,10α-steroid of the Formula VIII can be acylated in accordance with step (g) or step (f) respectively, to yield the corresponding compounds of Formula I. The acylation can be effected by treatment with an acylating agent, for example, a reactive acyl derivative such as an acyl anhydride or halide (e.g., fluoro, chloro, bromo or iodo) in the presence of a suitable organic base, preferably pyridine.

(F) The acyloxy group of a 9β,10α-steroid of the Formula VII or its 1(2) or 6(7)-dehydro or 1(2),6(7)-bis-dehydro derivative can be saponified in accordance with step (e). The saponification can be effected by means of a mild base, preferably an alkali carbonate or hydrogen carbonate.

(G) The alkylation of the 3-hydroxy group of a 9β,10α-steroid of the Formula VIII in accordance with step (f) or the enoletherification of a 9β,10α-steroid of the Formula V in accordance with step (d) can be effected by the reaction of the starting steroid with the desired alcohol e.g., methaol, ethanol, benzyl alcohol or cyclohexyl alcohol in the presence of p-toluene sulfonic acid. Other convenient methods of preparing the ether derivatives include reacting the starting material of Formula V or VIII with an orthoformic acid ester in the presence of a mineral acid such as hydrogen chloride or with a dialkoxypropane, e.g., 2,2 - dimethoxypropane in methanol/dimethylformamide solvent using p-toluene sulfonic acid as the catalyst. The 3-enol esterification of a 9β,10α-steroid of the Formula V or of a 6(7)-dehydro derivative thereof can be effected in accordance with step (d) of Reaction Scheme A. The esterification can be effected by treatment with an acylating agent such as isopropenyl acetate in the presence of a catalyst such as p-toluene sulfonic acid.

The starting compounds utilized for the processes in accordance with Reaction Scheme A, insofar as they are not known or their manufacture has not heretofore been described can be obtained according to methods known to those skilled in the art.

The 9β,10α-steroids represented by Formula I are characterized by a high degree of endrocrinological usefulness. These compounds are hormonally active, more specifically as progestational agents or anti-estrogenic agents. Moreover, these compounds influence gonadotropin secretion and/or production. The usefulness of the compounds exhibiting progestational and anti-estrogenic activity has been demonstrated in animals using standard pharmacogical tests employed for this purpose such as the deciduoma test in castrated rodents and the Clauberg assay in juvenile rabbits using dosages of from 20 to 200 μg. and the determination of LH and FSH content of the pituitary glands after 3 weeks treatment according to the ovarian ascorbic acid depletion test of Parlow and the ovarian weight augmentation test of Steelman and Pohley, respectively. The compounds of Formula I can be used in the form of conventional pharmaceutical preparations. These conventional pharmaceutical preparations containing the compounds of Formula I can contain then in admixture with conventional organic or inorganic inert carrier materials suitable for enteral or parenteral administration, such as, for example, water, gelatin, lactose, starch, talc, vegetable oil, gums, polyalkylene glycols, vaseline and the like. These preparations can be in conventional solid forms, such as, tablets, dragees, capsules or in conventional liquid forms such as solutions, suspensions or emulsions. They can be subjected to conventional pharmaceutical expedients such as, sterilization and/or contain, conventional pharmaceutical additives, such as preservatives, stabilizing agents, wetting or emulsifying agents, salts for adjusting the osmotic pressure or buffers. They can also contain other active ingredients including other hormonally active The following examples are illustartive of the invention but are not limitative thereof. All temperatures are stated in ° C.

EXAMPLE 1

A solution of 28 g. of sodium borohydride in 400 ml. of water is added over a 10 minute period to a solution of 6-chloro - 9β,10α-pregna-4,6-diene-3,20-dione in 700 ml. of dioxan and 2000 ml. of methanol cooled to 0°. The reaction solution is subsequently stirred at 0° for an additional 30 minutes, then poured onto 10 liters of ice-water and 50 ml. of acetic acid and extracted three times with methylene chloride. The organic extracts are combined, washed with water, dried with sodium sulphate and evaporated to dryness in vacuum. The residue is recrystallized twice from alcohol yielding pure 6 - chloro-3α,20β-dihydroxy-9β,10α-pregna-4,6-diene, M.P. 142–144°.

The mother liquors from the above reaction, consisting primarily of 6 - chloro - 6-ξ,20ξ-dihydroxy-9β,10α-pregna-4,6-diene are dissolved in 1000 ml. of chloroform and stirred at room temperature for 3 hours with 100 g. of manganese dioxide. The reaction mixture is filtered and the residue is then rinsed with chloroform. The combined filtrates are evaporated in vacuum and the residue chromatographed on 600 g. of silica gel with hexane/acetone. Elution with hexane/acetone (92:8) and recrystallization from ether yields 6 - chloro-20β-hydroxy-9β,10α-pregna-4,6-dien-3-one, M.P. 180–182°.

Further elution with hexane/acetone (9:1) yields 6-chloro - 20α-hydroxy-9β,10α-pregna-4,6-dien-3-one, M.P. 156.5–158.5° (from ether).

EXAMPLE 2

A solution of 5.0 g. of 6-chloro-20α-hydroxy-9β,10α-pregna-4,6-dien-3-one and 4.23 g. of 2,3-dichloro-5,6-dicyano-benzoquinone in 200 ml. of dioxan containing 0.2% of hydrogen chloride is stirred at room temperature for 6 hours. 200 g. of sodium carbonate is then added and the mixture is heated to reflux for 30 minutes. The cooled reaction mixture is filtered and the residue is rinsed with dioxan. The combined filtrates are treated with the same volume of benzene and filtered through a column of 100 g. of aluminum oxide (act. I). The substance is completely eluted with acetic ester. The combined eluates, after evaporation in vacuum yield 5.0 g. of residue which is chromatographed on 250 g. of silica gel. Elution with ether/hexane (2:1) yields 6-chloro-20α-hydroxy-9β,10α-pregna-1,4,6-trien-3-one, M.P. 159–161° (acetone/hexane).

EXAMPLE 3

Using similar procedures to those employed in Example 2, 6-chloro-20β-hydroxy-9β,10α-pregna-4,6-diene-3-one yields 6-chloro-20β-hydroxy-9β,10α-pregna-1,4,6-trien-3-one, M.P. 209–210° (acetone/hexane).

EXAMPLE 4

A mixture of 1.5 g. of 6-chloro-20β-hydroxy-9β,10α-pregna-4,6-dien-3-one, 40 ml. of pyridine and 40 ml. of acetic anhydride is held at room temperature for 4 hours and subsequently evaporated to dryness in vacuum. The residue, recrystallized from acetone/hexane, yields 6-chloro-20β-acetoxy-9β,10α-pregna-4,6-dien-3-one, M.P. 190–192°.

EXAMPLE 5

According to the methods described in Example 4, 6-chloro-20β-hydroxy-9β,10α-pregna-1,4,6-trien-3-one yields 6 - chloro - 20β - acetoxy-9β,10α-pregna-1,4,6-trien-3-one, M.P. 250–252°.

EXAMPLE 6

According to the methods described in Example 4, 6-chloro-3α,20β-dihydroxy-9β,10α-pregna-4,6-diene yields 6-chloro - 3α,20β - diacetoxy-9β,10α-pregna-4,6-diene, M.P. 134–135°.

EXAMPLE 7

A solution of 1.0 g. of 6-chloro-3α,20β-dihydroxy-9β,10α-pregna-4,6-diene in 100 ml. of alcohol is, after the addition of 0.5 g. of p-toluenesulphonic acid, heated at 50° for 1 hour. The reaction mixture is poured onto ice-cold, dilute sodium bicarbonate solution and extracted with ether. The ether extracts are washed with water, dried with sodium sulphate and evaporated in vacuum. The residue is chromatographed on silica gel. 3β-ethoxy-6-chloro-20β-hydroxy-9β,10α-pregna-4,6-dien is first eluted with hexane/acetone and then chromatographed on silica gel. The subsequent fractions yield 3α-ethoxy-6-chloro-20β-hydroxy-9β,10α-pregna-4,6-diene, $\epsilon_{246}$=20,500. Acetylation of 3α-ethoxy-6-chloro-20β-hydroxy-9β,10α-pregna-4,6-diene in accordance with the methods of Example 4 yields 20β-acetoxy-3α-ethoxy-6-chloro-9β,10α-pregna-4,6-diene, M.P. 125–126° (hexane).

EXAMPLE 8

A solution of 19.5 g. of potassium acetate in 400 ml. of 85% acetic acid is added with stirring over a 10 minute period to a solution of 11.40 g. of 3,20α-diacetoxy-pregna-3,5-diene in 200 ml. of ether which is cooled to −5°. A solution of 2.42 g. of chlorine in 56 ml. of glacial acetic is subsequently added dropwise over a 10 minute period at −5°. The mixture is then stirred for an additional 10 minutes, poured on ice-water and extracted with ether. The ether extract is washed neutral with sodium carbonate solution and water, dried with sodium sulphate and evaporated to dryness in vacuum. The residue is chromatographed on 500 g. of silica gel. Elution with hexane/ether (3:1) yields 20α-acetoxy-6β-chloro-9β,10α-pregn-4-en-3-one, M.P. 185–187° (from acetone/isopropyl ether).

The starting material 3,20α-diacetoxy-pregna-3,5-diene can be prepared as follows:

A mixture of 100 ml. of isopropenyl acetate and 200 ml. of benzene is added dropwise with stirring over a 6 hour period to a boiling solution of 9.0 g. of 20α-hydroxy-9β,10α-pregn-4-en-3-one and 0.9 g. of p-toluenesulphonic acid in 400 ml. of abs. benzene while 300 ml. of benzene are simultaneously distilled off via a Vigreux column. The cooled reaction mixture is then treated with 2 ml. of pyridine. The precipitate which separates out is filtered off and the filtrate is evaporated to dryness in vacuum below 40°. There is obtained 3,20α-acetoxy-pregna-3,5-diene which is directly used for the chlorination.

EXAMPLE 9

According to the methods described in Example 2, 20α-acetoxy-6-chloro-9β,10α-pregna-4,6-dien-3-one yields 20α-acetoxy - 6 - chloro-9β,10α-pregna-1,4,6-trien-3-one, M.P. 145–156° (from ether).

EXAMPLE 10

A mixture of 8.90 g. of 20α-acetoxy-6β-chloro-9β,10α-pregn-4-en-3-one, 0.5 g. of p-toluenesulphonic acid, 8.5 ml. of orthoformic acid ethyl ester and 120 ml. of abs. dioxan is held at 25° for 15 hours to the exclusion of light. The reaction mixture is then added over a 15 minute period with stirring to a mixture of 45 g. of manganese dioxide, 450 ml. of glacial acetic and 36 ml. of water. The reaction mixture is subsequently stirred at room temperature for 2 hours, poured onto a large amount of ice-water and extracted with methylene chloride. The organic extracts are washed neutral with water, dried with sodium sulphate and evaporated to dryness in vacuum. The residue is chromatographed on silica gel yielding 20α-acetoxy-6-chloro-9β,10α-pregna-4,6-dien-3-one on elution with hexane/acetone (9:1). M.P. 159–160° (from acetone/hexane).

EXAMPLE 11

A solution of 5.3 ml. of chromyl chloride in 10 ml. of methylene chloride is added within 45 minutes with good stirring to a solution of 3.50 g. of 20α-acetoxy-9β,10α-pregna-4,6-dien-3-one in 100 ml. of methylene chloride which had been cooled to −15°. It is stirred at −15° for an additional 3 hours. The brown precipitate is subsequently filtered off and this is washed several times with cold methylene chloride. The filter cake is introduced with stirring into a solution of 21 g. of sodium acetate and 25.7 g. of sodium pyrosulphite in 300 ml. of ice-water and immediately treated with 150 ml. of ethyl acetate. The mixture is stirred for 40 minutes, the organic phase is then separated off and the aqueous phase extracted twice more with ethyl acetate. The combined organic extracts are washed neutral with dilute sodium acetate solution and water, dried with $Na_2SO_4$ and evaporated in vacuum. The residue is dissolved in 50 ml. of dioxan which contains 2% of hydrogen chloride and held at room temperature for 15 hours. For the work-up, the mixture is poured onto ice-water and extracted with ethyl acetate. The extract is washed neutral with dilute sodium bicarbonate solution in water, dried with sodium sulphate and evaporated in vacuum. After chromatography on silica gel and recrystallization from acetone/hexane, the crude product yields 20α-acetoxy-6-chloro-9β,10α-pregna-4,6-dien-3-one, M.P. 159–160°.

EXAMPLE 12

Tablets for oral administration can be prepared using the following recipe:

| | Mg. |
|---|---|
| 6 - chloro-20α-hydroxy-9β,10α-pregna-1,4,6-triene-3-one | 5 |
| Lactose | 60 |
| Starch | 33 |
| Talc | 1.8 |
| Magnesium stearate | 0.2 |
| Total | 100.0 |

We claim:
1. A compound of the formula

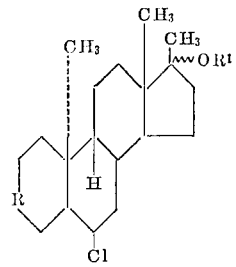

wherein R is a 3-keto-$\Delta^4$-, a 3-keto-$\Delta^{4,6}$-, a 3-keto-$\Delta^{1,4}$-, a 3-keto-$\Delta^{1,4,6}$-, a 3-alkoxy-$\Delta^{4,6}$-, a 3-acyloxy-$\Delta^{3,5}$-, 3-acyloxy-$\Delta^{4,6}$-, or a 3-hydroxy-$\Delta^{4,6}$-system; and $R^1$ is hydrogen or acyl.

2. A compound as in claim 1 which is 6-chloro-3α,20β-dihydroxy-9β,10α-pregna-4,6-diene.
3. A compound as in claim 1 which is 6-chloro-20β-hydroxy-9β,10α-pregna-4,6-dien-3-one.
4. A compound as in claim 1 which is 6-chloro-20α-hydroxy-9β,10α-pregna-4,6-dien-3-one.
5. A compound as in claim 1 which is 6-chloro-20α-hydroxy-9β,10α-pregna-1,4,6-trien-3-one.
6. A compound as in claim 1 which is 6-chloro-20β-hydroxy-9β,10α-pregna-1,4,6-trien-3-one.
7. A compound as in claim 1 which is 6-chloro-20β-acetoxy-9,β10α-pregna-4,6-dien-3-one.
8. A compound as in claim 1 which is 6-chloro-20β-acetoxy-9β,10α-pregna-1,4,6-trien-3-one.
9. A compound as in claim 1 is 6-chloro-3α,20β-diacetoxy-9β,10α-pregna-4,6-diene.
10. A compound as in claim 1 which is 3α-ethoxy-6-chloro-20β-hydroxy-9β,10α-pregna-4,6-diene.
11. A compound as in claim 1 which is 20β-acetoxy-3α-ethoxy-6-chloro-9β,10α-pregna-4,6-diene.
12. A compound as in claim 1 which is 20α-acetoxy-6β-chloro-9β,10α-pregn-4-en-one.
13. A compound as in claim 1 which is 20α-acetoxy-6-chloro-9β,10α-pregna-1,4,6-trien-3-one.
14. A compound as in claim 1 which is 20α-acetoxy-6-chloro-9β,10α-pregna-4,6-dien-3-one.

References Cited

UNITED STATES PATENTS 3,373,172   3/1968   Reerink et al. _____ 260—397.45

ELBERT L. ROBERTS, Primary Examiner

U.S. Cl. X.R.

260—397.5